(12) United States Patent
Ahn

(10) Patent No.: US 12,264,710 B2
(45) Date of Patent: Apr. 1, 2025

(54) MAGNETIC BEARING WITH COAXIAL EDDY CURRENT DISPLACEMENT SENSOR

(71) Applicant: FOUNDATION OF SOONGSIL UNIVERSITY-INDUSTRY COOPERATION, Seoul (KR)

(72) Inventor: Hyeong Joon Ahn, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 258 days.

(21) Appl. No.: 18/012,862

(22) PCT Filed: Apr. 16, 2021

(86) PCT No.: PCT/KR2021/004832
§ 371 (c)(1),
(2) Date: Dec. 23, 2022

(87) PCT Pub. No.: WO2021/261731
PCT Pub. Date: Dec. 30, 2021

(65) Prior Publication Data
US 2023/0265891 A1 Aug. 24, 2023

(30) Foreign Application Priority Data

Jun. 25, 2020 (KR) ........................ 10-2020-0077476

(51) Int. Cl.
*F16C 32/04* (2006.01)
*F16C 41/00* (2006.01)

(52) U.S. Cl.
CPC ........ *F16C 41/007* (2013.01); *F16C 32/0474* (2013.01)

(58) Field of Classification Search
None
See application file for complete search history.

(56) References Cited

U.S. PATENT DOCUMENTS

2008/0073993 A1* 3/2008 Sortore ............... F16C 32/0489
310/90.5
2013/0015731 A1* 1/2013 Griffin ................ F16C 32/0474
310/58

(Continued)

FOREIGN PATENT DOCUMENTS

JP H05-280542 A 10/1993
KR 10-0152975 B1 12/1998

(Continued)

*Primary Examiner* — Quyen P Leung
*Assistant Examiner* — Masoud Vaziri
(74) *Attorney, Agent, or Firm* — Bridgeway IP Law Group, PLLC; Jihun Kim

(57) ABSTRACT

A magnetic bearing having a colocated eddy-current displacement sensor, comprising an electromagnet unit including a circular casing having a hollow portion therein, and a plurality of electromagnets disposed along an inner periphery of the casing, an amplifier unit coupled to one side of the electromagnet unit, a coil wiring unit coupled to the other side of the electromagnet unit, and a plurality of sensor units disposed along an inner periphery of the electromagnet unit and each having two opposite ends respectively coupled to the coil wiring unit and the amplifier unit, the plurality of sensor units being provided between the coil wiring unit and the amplifier unit, in which the sensor unit is disposed colocatedly with a suspended body supported by the electromagnet unit and configured to measure a displacement of the suspended body.

11 Claims, 15 Drawing Sheets

(56) References Cited

U.S. PATENT DOCUMENTS

| | | | | |
|---|---|---|---|---|
| 2016/0153492 A1* | 6/2016 | Baucé | ................ | F16C 32/0446 |
| | | | | 310/90.5 |
| 2016/0169280 A1* | 6/2016 | Boeld | ................ | F16C 32/0446 |
| | | | | 310/90.5 |
| 2018/0292235 A1* | 10/2018 | Filatov | ................ | G01D 5/2053 |
| 2019/0024667 A1* | 1/2019 | Kawashima | .......... | F04D 17/168 |
| 2019/0219377 A1* | 7/2019 | Denk | ................ | F16C 32/0446 |
| 2020/0232506 A1* | 7/2020 | Vikman | ............. | F16C 32/0474 |

FOREIGN PATENT DOCUMENTS

| | | |
|---|---|---|
| KR | 10-0210655 B1 | 7/1999 |
| KR | 10-0622098 B1 | 9/2006 |
| KR | 10-1039162 B1 | 6/2011 |
| KR | 10-1158812 B1 | 6/2012 |

\* cited by examiner

MAGNETIC BEARING WITH COAXIAL EDDY CURRENT DISPLACEMENT SENSOR

TECHNICAL FIELD

The present invention relates to a magnetic bearing having a colocated eddy-current displacement sensor, and more specifically, to a magnetic bearing having a colocated eddy-current displacement sensor that reduces a sensor installation space and manufacturing costs and solves a problem of sensor noise.

BACKGROUND ART

In general, a magnetic bearing is configured to serve as a bearing. In the magnetic bearing, magnets or electromagnets with high magnetism are disposed around a rotary shaft, and a suspended body provided in a direction perpendicular to the rotary shaft is levitated by magnet.

More specifically, unlike a general ball bearing in the related art, the magnetic bearing is configured such that the suspended body is supported in the air by a magnetic force in a contactless manner without being in direct contact with a rotary body so that the suspended body may rotate or rectilinearly move.

Because the bearings in the related art often cause friction made by contact, the magnetic bearings for minimizing friction have been recently used in various fields.

In the case of the magnetic bearing, an axial displacement of a rotary body needs to be measured to prevent contact between the suspended body and the magnet and control an accurate operation of the bearing.

FIG. 1 is an exemplified view of a sensor for controlling a displacement of a magnetic bearing in the related art.

As illustrated in FIG. 1, a magnetic bearing 1 in the related art requires a separate installation space for a sensor 3 because the sensor 3 needs to be installed at a side of the bearing 2 including an electromagnet.

In addition, in case that the sensor 3 is positioned at the side of the bearing 2 as illustrated in FIG. 1, the suspended body and the sensor 3 are not colocatedly positioned and aligned, which cause problems in that the accuracy in measuring a displacement deteriorates, and there is a difficulty in designing and controlling the bearing.

Accordingly, there is a need for a magnetic bearing having a colocated eddy-current displacement sensor to reduce a sensor installation space and manufacturing costs and solve a problem of sensor noise.

DOCUMENT OF RELATED ART

Korean Patent No. 10-1158812

DISCLOSURE

Technical Problem

An object of the present invention for solving the above-mentioned problems is to provide a magnetic bearing having a colocated eddy-current displacement sensor that reduces a sensor installation space and manufacturing costs and solves a problem of sensor noise.

Technical problems to be solved by the present invention are not limited to the above-mentioned technical problems, and other technical problems, which are not mentioned above, may be clearly understood from the following descriptions by those skilled in the art to which the present invention pertains.

Technical Solution

A configuration of the present invention for achieving the above-mentioned object provides a magnetic bearing having a colocated eddy-current displacement sensor, the magnetic bearing including: an electromagnet unit including a circular casing having a hollow portion therein, and a plurality of electromagnets disposed along an inner periphery of the casing; an amplifier unit coupled to one side of the electromagnet unit; a coil wiring unit coupled to the other side of the electromagnet unit; and a plurality of sensor units disposed along an inner periphery of the electromagnet unit and each having two opposite ends respectively coupled to the coil wiring unit and the amplifier unit, the plurality of sensor units being provided between the coil wiring unit and the amplifier unit, in which the sensor unit is disposed colocatedly with a suspended body supported by the electromagnet unit and configured to measure a displacement of the suspended body.

According to the embodiment of the present invention, the electromagnet unit may include: a vertical frame provided between the casing and the electromagnet and extending toward the coil wiring unit and the amplifier unit; and a horizontal frame provided at an end of the vertical frame and coupled to the coil wiring unit and the amplifier unit.

According to the embodiment of the present invention, the sensor unit may include: a sensor substrate configured as a PCB; a sensor coil provided on the sensor substrate; and protrusion bodies protruding from four corners of the sensor substrate in a longitudinal direction of the sensor substrate, and the protrusion bodies may be provided to be fitted into holes formed in the coil wiring unit and the amplifier unit.

According to the embodiment of the present invention, the magnetic bearing may further include: a support unit coupled between the sensor unit and the casing and extending to have a length corresponding to the sensor unit, in which the support unit is disposed in a direction orthogonal to the sensor unit.

According to the embodiment of the present invention, the sensor unit may include: a center hole formed at a center of a sensor substrate configured as a PCB; and edge holes formed at two opposite ends based on a longitudinal direction of the sensor substrate, and the support unit may be provided to be fitted into the center hole and the edge holes.

According to the embodiment of the present invention, the magnetic bearing may further include a reinforcement unit having two opposite ends coupled to the coil wiring unit and the amplifier unit.

According to the embodiment of the present invention, the electromagnet unit may further include a column part provided between the casing and the coil wiring unit, and the column part may be provided as a plurality of column parts provided along a periphery of the other side surface of the casing.

According to the embodiment of the present invention, the magnetic bearing may further include a coupling unit configured to further couple and fix the sensor unit to the horizontal frame.

According to the embodiment of the present invention, the sensor unit may include: a sensor substrate configured as a PCB; a sensor coil provided on the sensor substrate; and fitting holes formed at four corners of the sensor substrate.

According to the embodiment of the present invention, the coupling unit may include: a coupling body configured to define a body and extending in a direction parallel to the sensor substrate; a pair of fitting bodies extending toward the fitting holes disposed adjacent to two opposite ends of the coupling body and fitted into the fitting holes; and a pair of fixing bodies extending from the two opposite ends of the coupling body and extending to be respectively coupled to the adjacent horizontal frames.

Advantageous Effects

According to the effect of the present invention configured as described above, it is possible to reduce a sensor installation space and manufacturing costs and solve a problem of sensor noise.

In addition, according to the present invention, the sensor unit is assembled by fitting, which makes it easy to assemble and disassemble the sensor unit.

In addition, according to the present invention, the support unit supports the sensor unit while being oriented in a direction orthogonal to the sensor unit. Therefore, even in case that the electromagnet unit rotates, it is possible to prevent the sensor substrate from being bent or deformed.

The effects of the present invention are not limited to the above-mentioned effects, and it should be understood that the effects of the present invention include all effects that may be derived from the detailed description of the present invention or the appended claims.

BEST MODE

Figure 1:
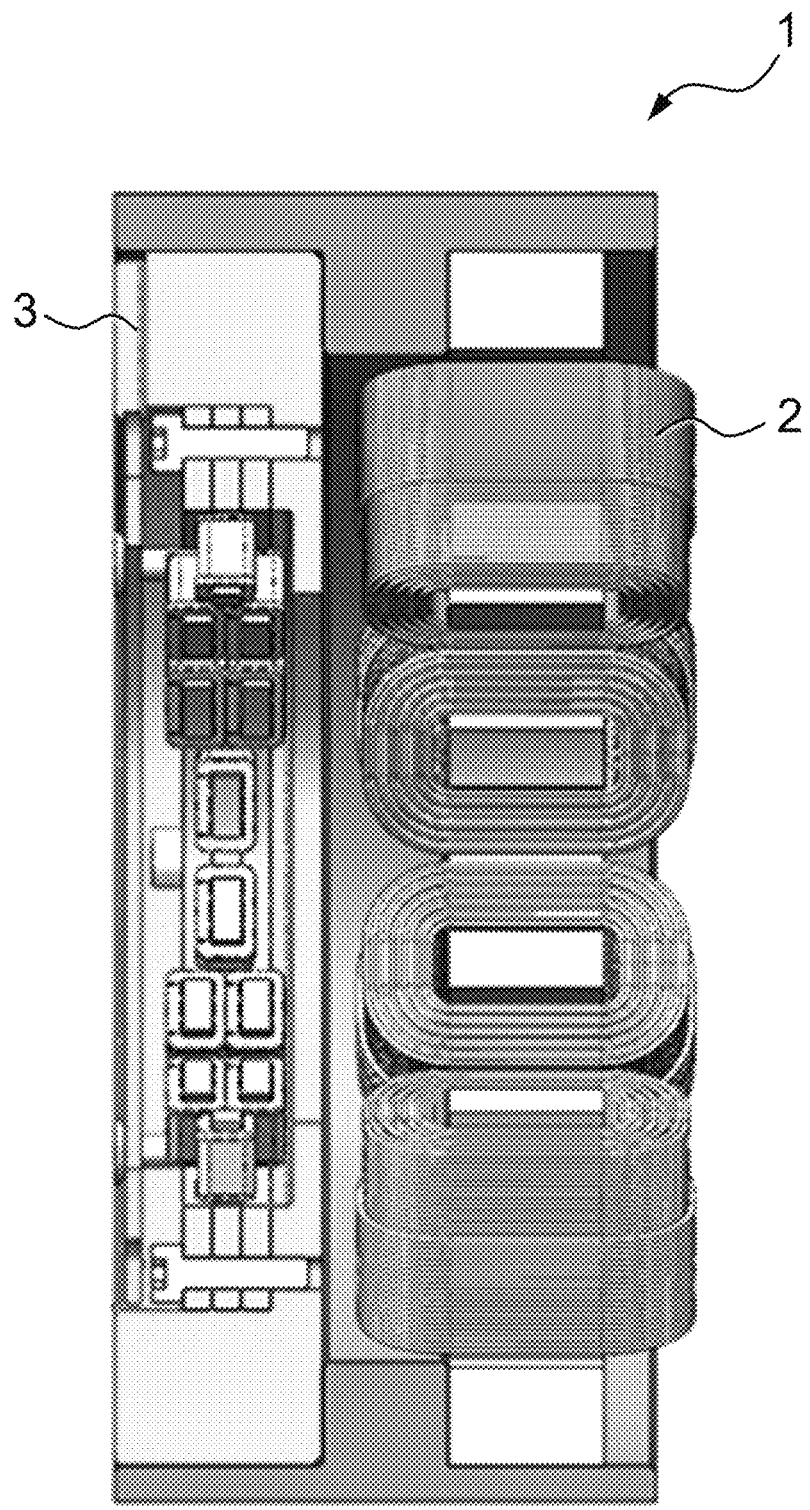
FIG. 1 is an exemplified view of a sensor for controlling a displacement of a magnetic bearing in the related art.

The most exemplary embodiment according to the present invention provides a magnetic bearing having a colocated eddy-current displacement sensor, the magnetic bearing including: an electromagnet unit including a circular casing having a hollow portion therein, and a plurality of electromagnets disposed along an inner periphery of the casing; an amplifier unit coupled to one side of the electromagnet unit; a coil wiring unit coupled to the other side of the electromagnet unit; and a plurality of sensor units disposed along an inner periphery of the electromagnet unit and each having two opposite ends respectively coupled to the coil wiring unit and the amplifier unit, the plurality of sensor units being provided between the coil wiring unit and the amplifier unit, in which the sensor unit is disposed colocatedly with a suspended body supported by the electromagnet unit and configured to measure a displacement of the suspended body.

MODE FOR INVENTION

Hereinafter, the present invention will be described with reference to the accompanying drawings. However, the present invention may be implemented in various different ways and is not limited to the embodiments described herein. Further, a part irrelevant to the description will be omitted in the drawings in order to clearly describe the present invention, and similar constituent elements will be designated by similar reference numerals throughout the specification.

Throughout the present specification, when one constituent element is referred to as being "connected to (coupled to, in contact with, or linked to)" another constituent element, one constituent element can be "directly connected to" the other constituent element, and one constituent element can also be "indirectly connected to" the other element with other elements interposed therebetween. In addition, unless explicitly described to the contrary, the word "comprise/include" and variations such as "comprises/includes" or "comprising/including" will be understood to imply the inclusion of stated elements, not the exclusion of any other elements.

The terms used in the present specification are used only for the purpose of describing particular embodiments and are not intended to limit the present invention. Singular expressions include plural expressions unless clearly described as different meanings in the context. In the present specification, it should be understood the terms "comprises," "comprising," "includes," "including," "containing," "has,"

"having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Hereinafter, the embodiment of the present invention will be described with reference to the accompanying drawings.

Figure 2:
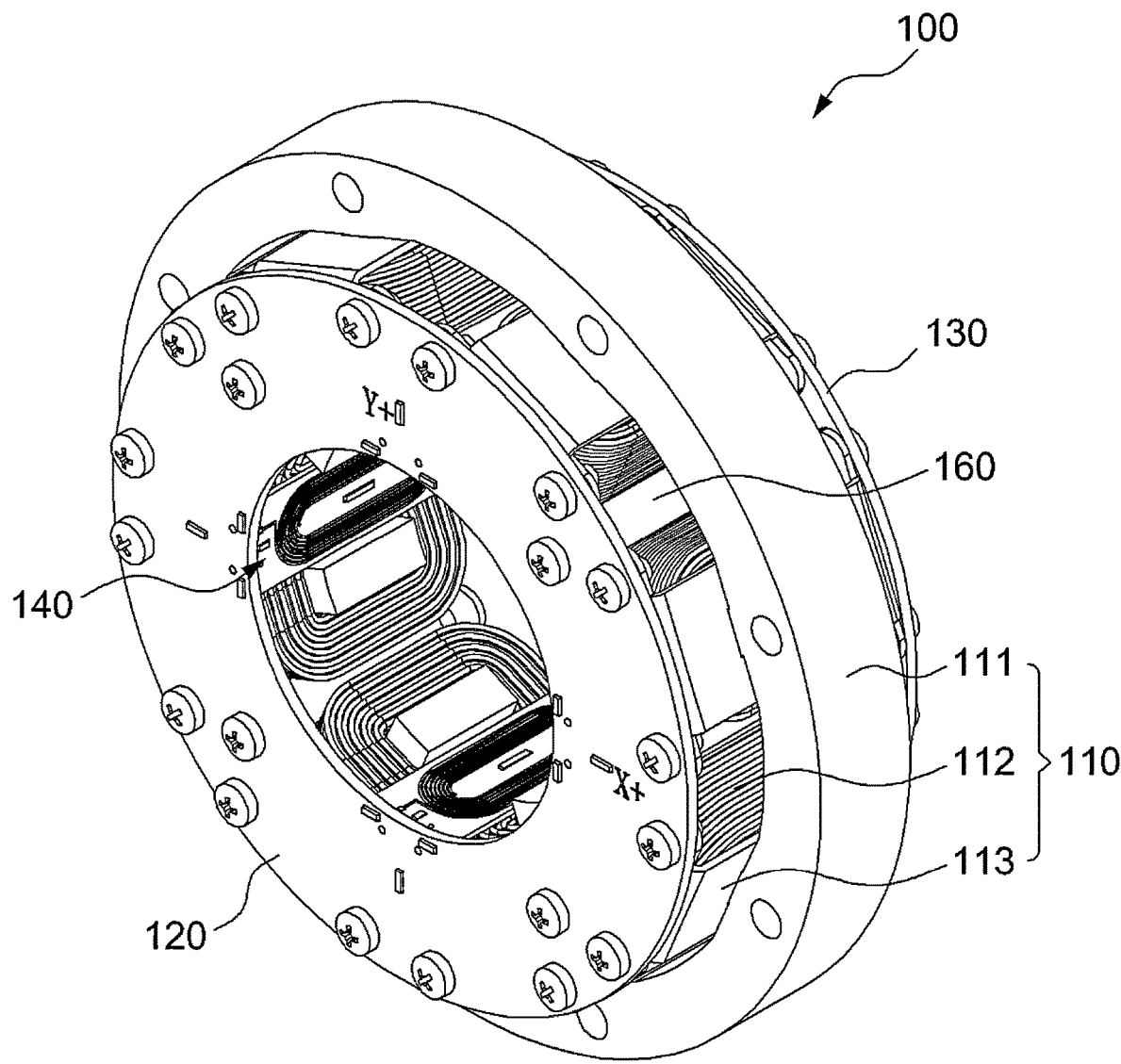
FIG. 2 is a perspective view illustrating an amplifier unit of a magnetic bearing having a colocated eddy-current displacement sensor according to a first embodiment of the present invention.
Figure 3:
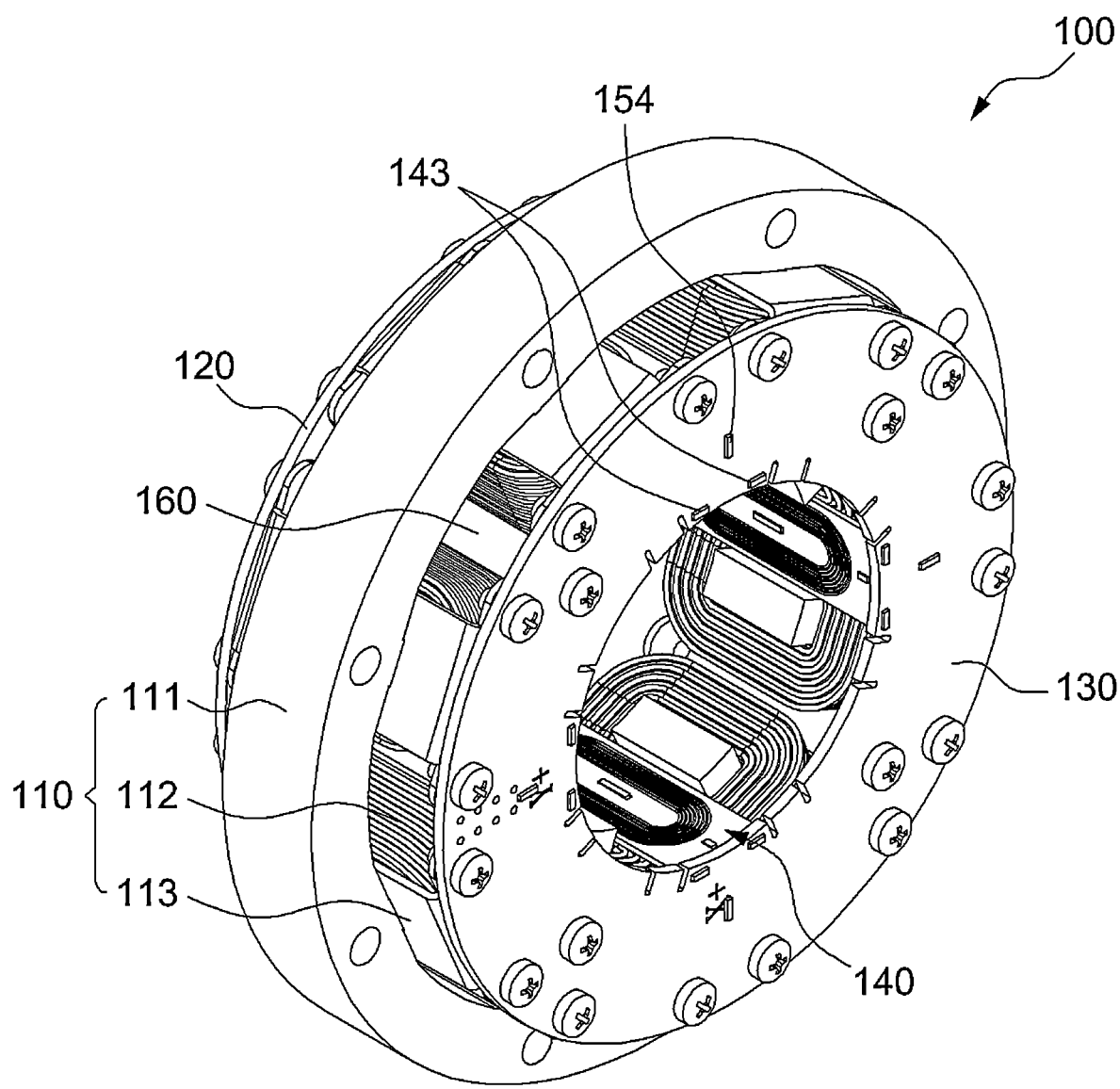
FIG. 3 is a perspective view illustrating a coil wiring unit of the magnetic bearing having the colocated eddy-current displacement sensor according to the first embodiment of the present invention.

FIG. 2 is a perspective view illustrating an amplifier unit of a magnetic bearing having a colocated eddy-current displacement sensor according to a first embodiment of the present invention, and FIG. 3 is a perspective view illustrating a coil wiring unit of the magnetic bearing having the colocated eddy-current displacement sensor according to the first embodiment of the present invention.

Figure 4:
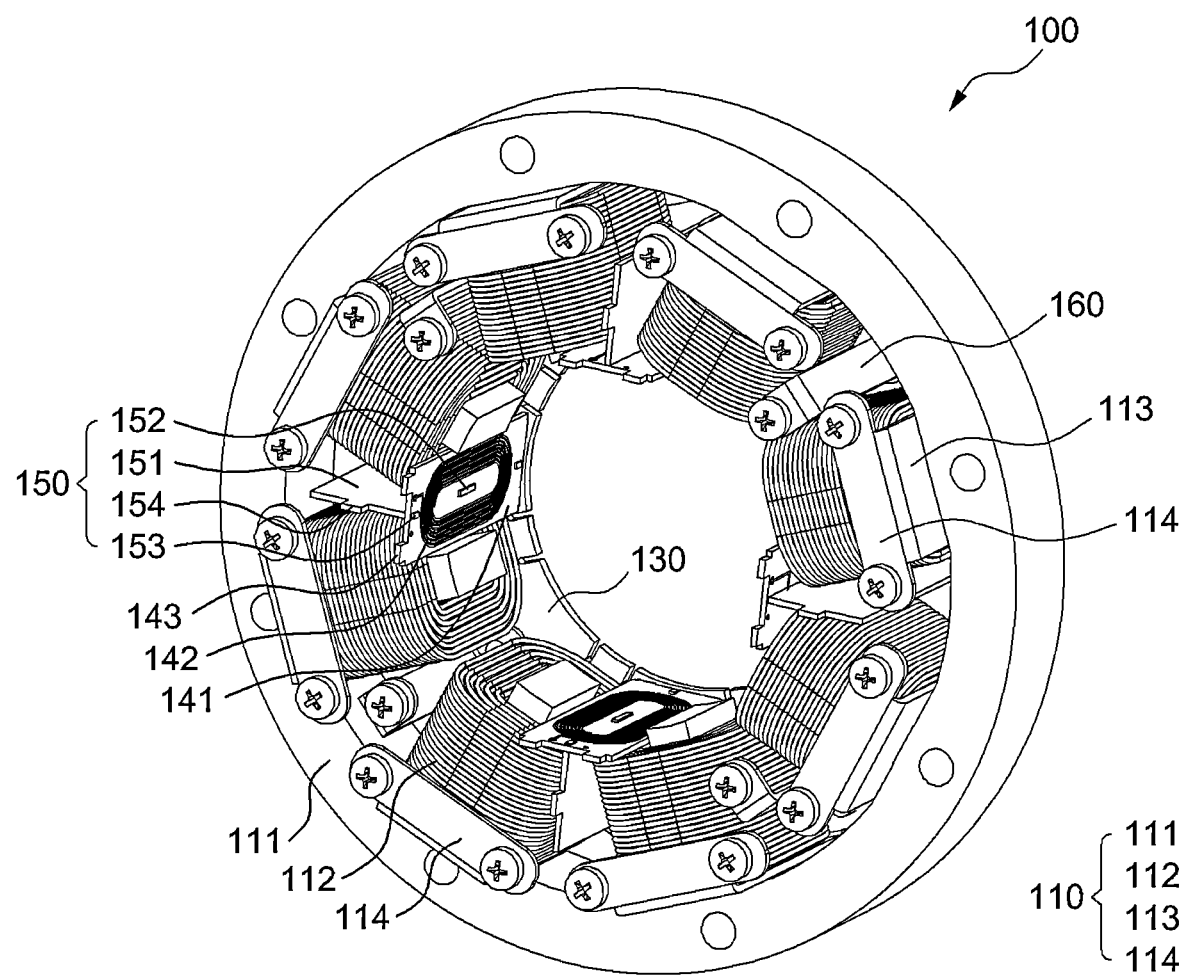
FIG. 4 is a perspective view illustrating a state in which the amplifier unit of the magnetic bearing having the colocated eddy-current displacement sensor according to the first embodiment of the present invention is detached.
Figure 5:
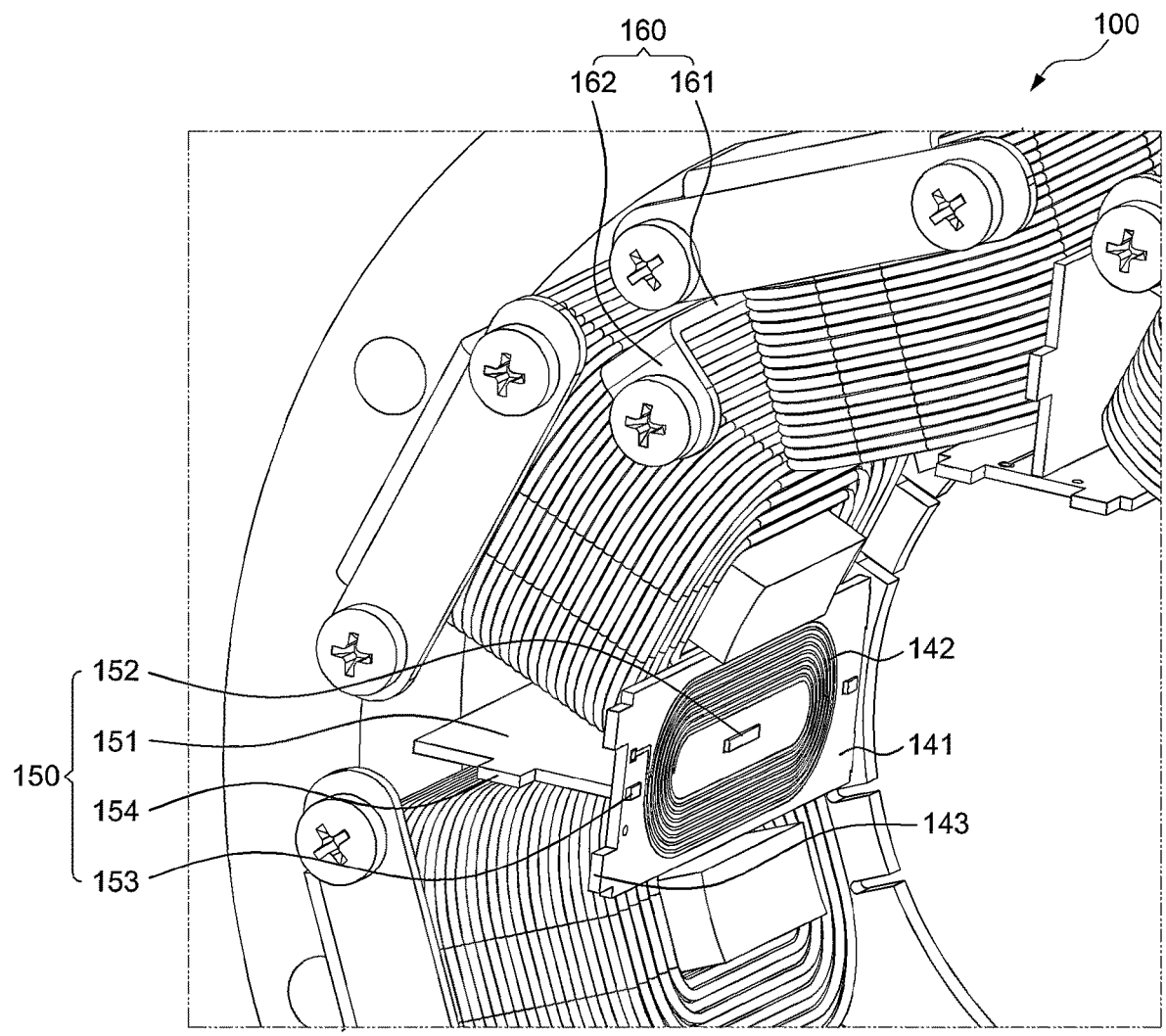
FIG. 5 is an enlarged perspective view of a sensor unit of the magnetic bearing having the colocated eddy-current displacement sensor according to the first embodiment of the present invention.
Figure 6:
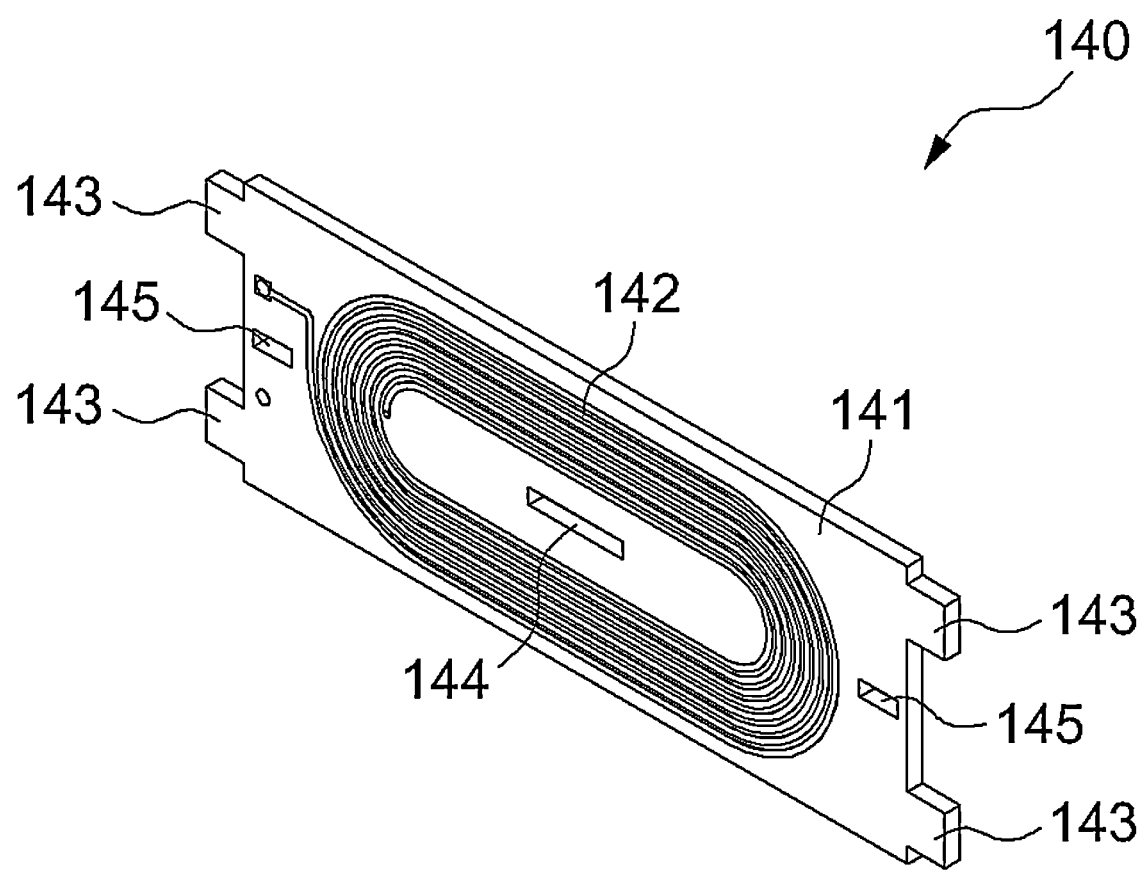
FIG. 6 is a perspective view of the sensor unit according to the first embodiment of the present invention.

FIG. 4 is a perspective view illustrating a state in which the amplifier unit of the magnetic bearing having the colocated eddy-current displacement sensor according to the first embodiment of the present invention is detached, FIG. 5 is an enlarged perspective view of a sensor unit of the magnetic bearing having the colocated eddy-current displacement sensor according to the first embodiment of the present invention, and FIG. 6 is a perspective view of the sensor unit according to the first embodiment of the present invention.

Referring to FIGS. 2 to 6, a magnetic bearing 100 having a colocated eddy-current displacement sensor according to a first embodiment includes an electromagnet unit 110, an amplifier unit 120, a coil wiring unit 130, sensor units 140, support units 150, and reinforcement units 160.

The electromagnet unit 110 includes a casing 111, electromagnets 112, vertical frames 113, and horizontal frames 114.

The casing 111 may be formed as a circular frame having a hollow portion formed therein.

The electromagnet 112 may be provided as a plurality of electromagnets 112 disposed along an inner periphery of the casing 111. The electromagnet and a permanent magnet may be disposed to generate a magnetic force according to a flow of an electric current.

A suspended body may be provided to be rotatable while being floated in the hollow portion in the casing 111 by the electromagnets 112.

The vertical frame 113 may be provided between the casing 111 and the electromagnet 112 and extend toward the coil wiring unit 130 and the amplifier unit 120.

Specifically, the vertical frames 113 may extend toward the casing 111 and the coil wiring unit 130 and toward the casing 111 and the amplifier unit 120.

Alternatively, the single vertical frame 113 may extend toward the coil wiring unit 130 and the amplifier unit 120.

The horizontal frame 114 may be provided at an end of the vertical frame 113 and coupled to the coil wiring unit 130 and the amplifier unit 120.

Specifically, the horizontal frame 114 may extend from the end of the vertical frame 113 and have a predetermined length in a direction parallel to the coil wiring unit 130 and the amplifier unit 120.

The vertical frames 113 and the horizontal frames 114 fixedly couple the casing 111 and the amplifier unit 120 and fixedly couple the casing 111 and the coil wiring unit 130.

The amplifier unit 120 may be coupled to one side of the electromagnet unit 110. The amplifier unit 120 may be manufactured as a PCB. The amplifier unit 120 may be provided in the form of a circular plate having a hollow portion therein and corresponding to a shape of the casing 111.

The coil wiring unit 130 may be coupled to the other side of the electromagnet unit 110. The coil wiring unit 130 may be manufactured as a PCB. The coil wiring unit 130 may be provided in the form of a circular plate having a hollow portion therein and corresponding to the shape of the casing 111.

The sensor unit 140 may be provided as a plurality of sensor units 140. The sensor unit 140 has two opposite ends respectively coupled to the coil wiring unit 130 and the amplifier unit 120 so that the sensor unit 140 is positioned inside the electromagnet unit 110.

Specifically, the sensor unit 140 may be positioned at a front side of a portion between the pair of electromagnets 112. The sensor units 140 may be disposed at preset intervals.

The sensor unit 140 may be provided colocatedly with the suspended body supported by the electromagnet unit 110 and measure a displacement of the suspended body. An eddy-current displacement sensor may be used as the sensor unit 140.

More specifically, the sensor unit 140 includes a sensor substrate 141, a sensor coil 142, protrusion bodies 143, a center hole 144, and edge holes 145.

The sensor substrate 141 may be configured as a PCB and extend toward the amplifier unit 120 and the coil wiring unit 130. In this case, the sensor substrate 141 may extend to be longer in length than the electromagnet 112.

In addition, the sensor substrate 141 may be positioned between the electromagnets 112 inside the electromagnet unit 110 so that the sensor substrate 141 is disposed in parallel with a tangential direction at any point on an outer periphery of a central axis. The sensor substrate 141, provided as described above, may measure well the displacement of the suspended body supported along the central axis by the electromagnet unit 110.

The sensor coil 142 may be provided on the sensor substrate 141 and configured as an eddy-current sensor coil.

The protrusion bodies 143 may protrude from four corners of the sensor substrate 141 in a longitudinal direction of the sensor substrate 141.

The protrusion bodies 143, provided as described above, may be provided to be fitted into holes formed in the coil wiring unit 130 and the amplifier unit 120.

The center hole 144 may be provided in the form of a hole at a center of the sensor substrate 141. In this case, the center hole 144 may extend to have a predetermined length in the longitudinal direction of the sensor substrate 141. The center hole 144 may be positioned at a center based on a width direction of the sensor substrate 141.

The edge holes 145 may be formed at two opposite ends based on the longitudinal direction of the sensor substrate 141. That is, the edge holes 145 may be positioned on the same line as the center hole 144.

The support unit 150 may be coupled between the sensor unit 140 and the casing 111 and extend to have a length corresponding to the sensor unit 140. Further, the support unit 150 may be disposed in a direction orthogonal to the sensor unit 140.

More specifically, the support unit 150 includes a support body 151, a center support protrusion body 152, edge support protrusion bodies 153, and a support coupling body 154.

The support body 151 may define a body of the support unit 150 and extend toward the amplifier unit 120 and the coil wiring unit 130 so as to have a length corresponding to the sensor substrate 141.

In addition, the support body 151 may be oriented in a direction orthogonal to the sensor substrate 141, one side surface of the support body 151 may be fixed to the casing 111, and the other side of the support body 151 may be fixed while supporting a rear central axis of the sensor substrate 141.

The center support protrusion body 152 may be formed on the other side surface of the support body 151 and provided at a position corresponding to the center hole 144. The center support protrusion body 152, provided as described above, may be fitted into the center hole 144.

The edge support protrusion bodies 153 may be formed on the other side surface of the support body 151 and provided at positions corresponding to the edge holes 145. The edge support protrusion bodies 153, provided as described above, may be fitted into the edge holes 145.

The support unit 150, provided as described above, may prevent the sensor unit 140 from being bent or deformed.

Specifically, because the sensor unit 140 is a PCB provided in the form of a thin plate, the sensor unit 140 may be bent or deformed when the casing 111 rotates at high speed, which makes it difficult to accurately measure the displacement of the suspended body.

However, according to the present invention, because the support unit 150 is provided to support a center vertical axis of the sensor unit 140, it is possible to prevent the deformation of the sensor unit 140.

The reinforcement unit 160 has two opposite ends coupled to the coil wiring unit 130 and the amplifier unit 120 and includes a vertical reinforcement body 161 and reinforcement coupling bodies 162.

Two opposite ends of the vertical reinforcement body 161 may extend toward the coil wiring unit 130 and the amplifier unit 120.

The reinforcement coupling bodies 162 are provided as a pair of reinforcement coupling bodies 162 provided at the two opposite ends of the vertical reinforcement body 161. The pair of reinforcement coupling bodies 162 are respectively coupled to the coil wiring unit 130 and the amplifier unit 120.

As described above, according to the magnetic bearing 100 having the colocated eddy-current displacement sensor according to the first embodiment, the casing 111, the coil wiring unit 130, and the amplifier unit 120 are primarily coupled by the vertical frames 113 and the horizontal frames 114, and the coil wiring unit 130 and the amplifier unit 120 are secondarily coupled by the reinforcement units 160, which makes it possible to improve the durability.

In addition, the sensor unit 140 may also be positioned inside the electromagnet unit 110 by the above-mentioned coupling without deformation and accurately measure the displacement of the suspended body disposed colocatedly with the suspended body.

Figure 7:
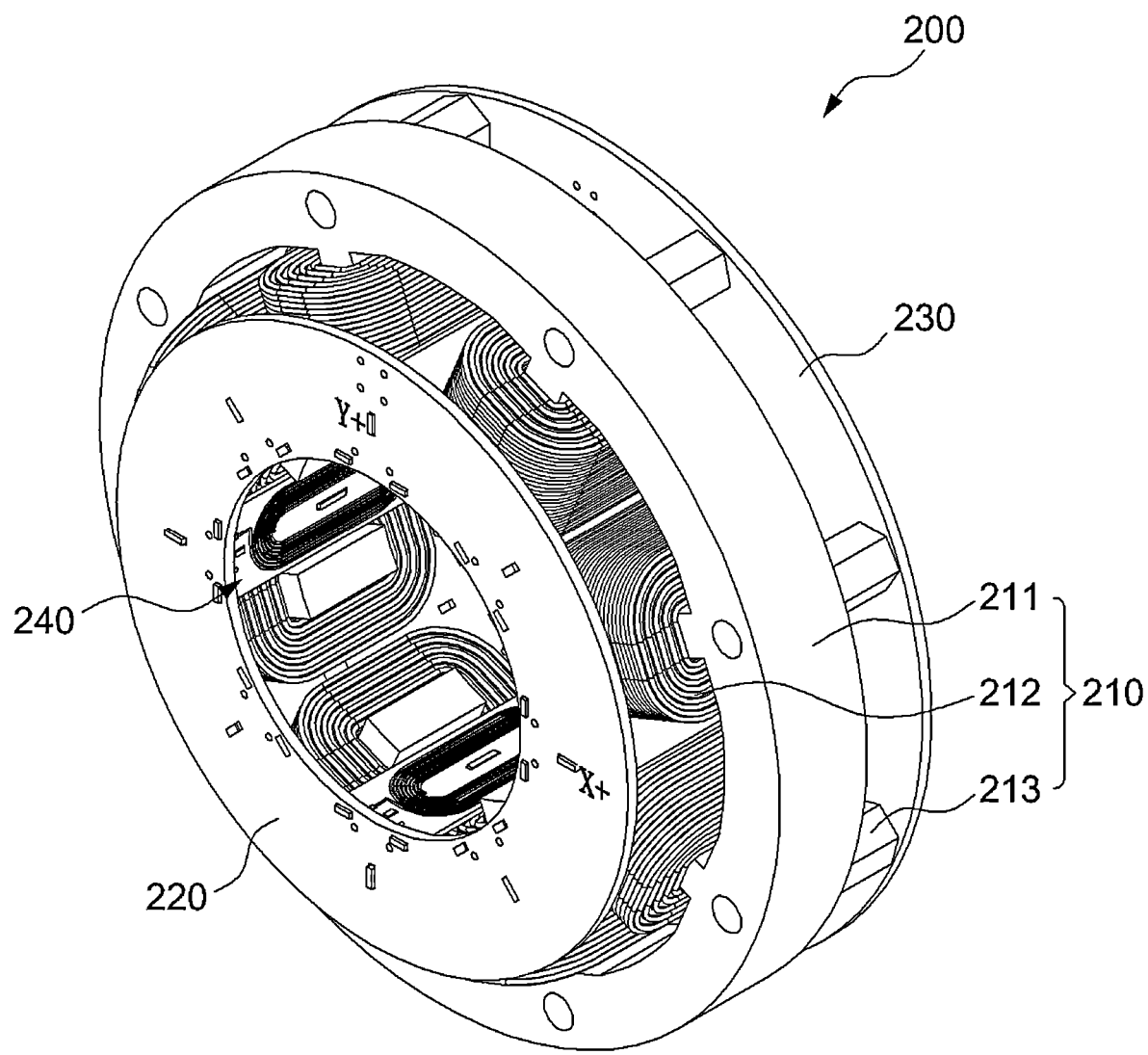
FIG. 7 is a perspective view illustrating an amplifier unit of a magnetic bearing having a colocated eddy-current displacement sensor according to a second embodiment of the present invention.
Figure 8:
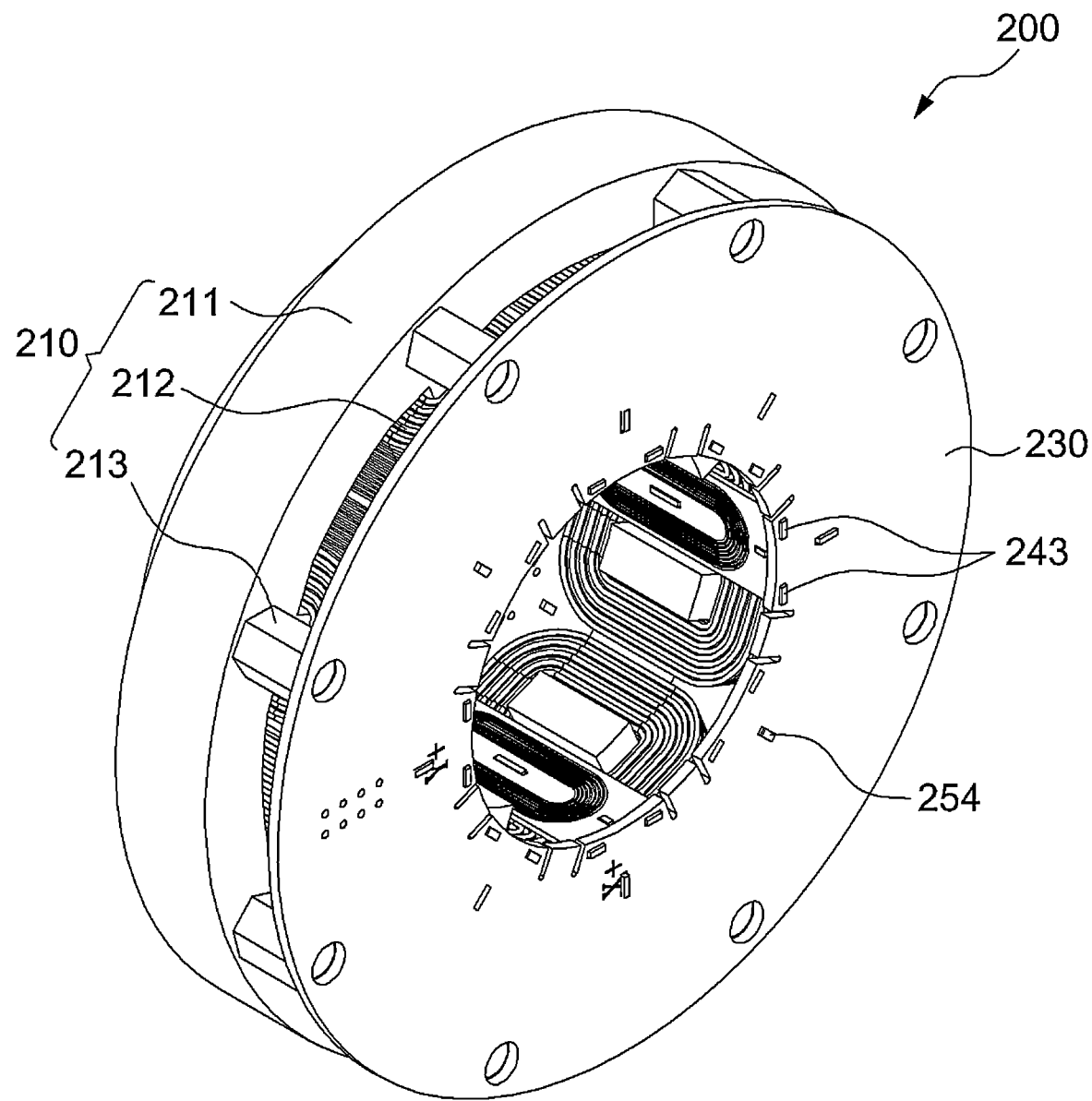
FIG. 8 is a perspective view illustrating a coil wiring unit of the magnetic bearing having the colocated eddy-current displacement sensor according to the second embodiment of the present invention.

FIG. 7 is a perspective view illustrating an amplifier unit of a magnetic bearing having a colocated eddy-current displacement sensor according to a second embodiment of the present invention, and FIG. 8 is a perspective view illustrating a coil wiring unit of the magnetic bearing having the colocated eddy-current displacement sensor according to the second embodiment of the present invention.

Figure 9:
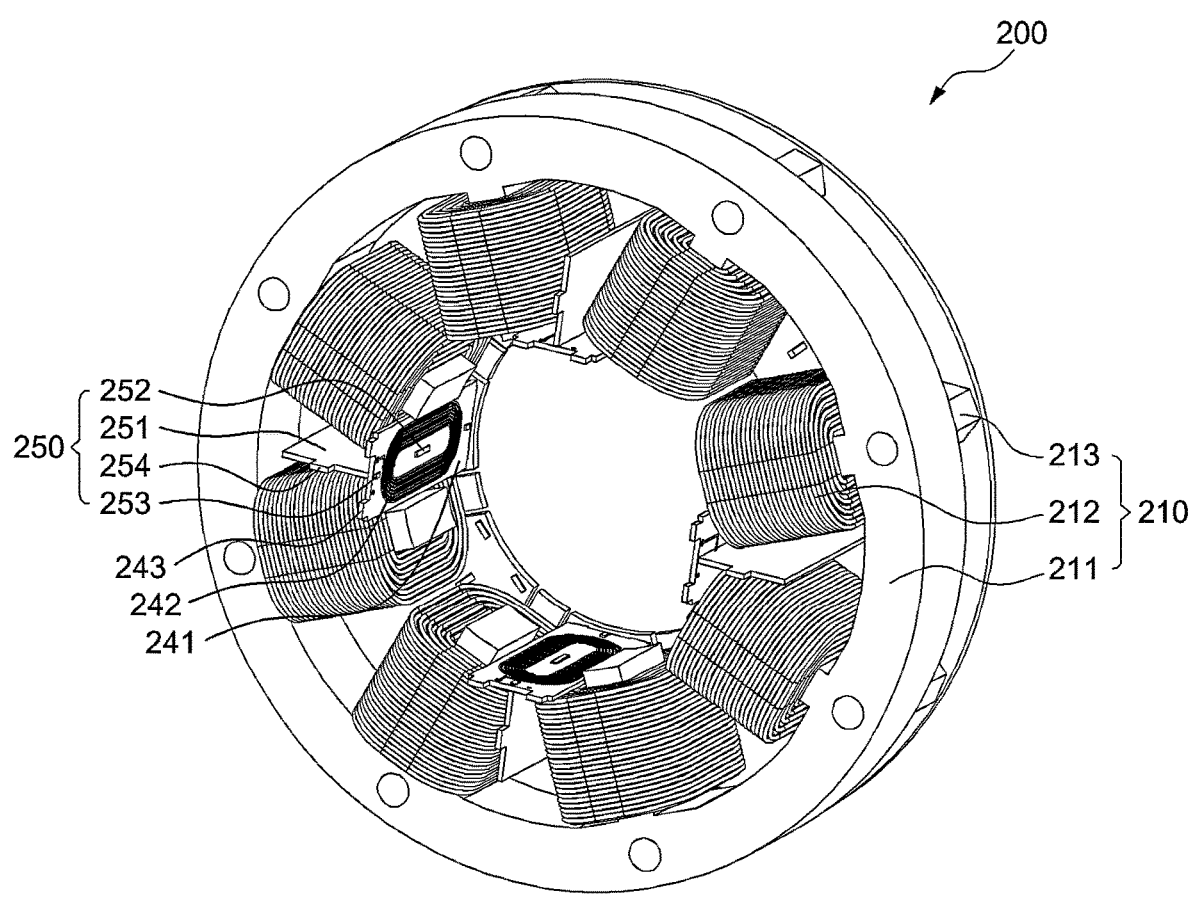
FIG. 9 is a perspective view illustrating a state in which the amplifier unit of the magnetic bearing having the colocated eddy-current displacement sensor according to the second embodiment of the present invention is detached.
Figure 10:
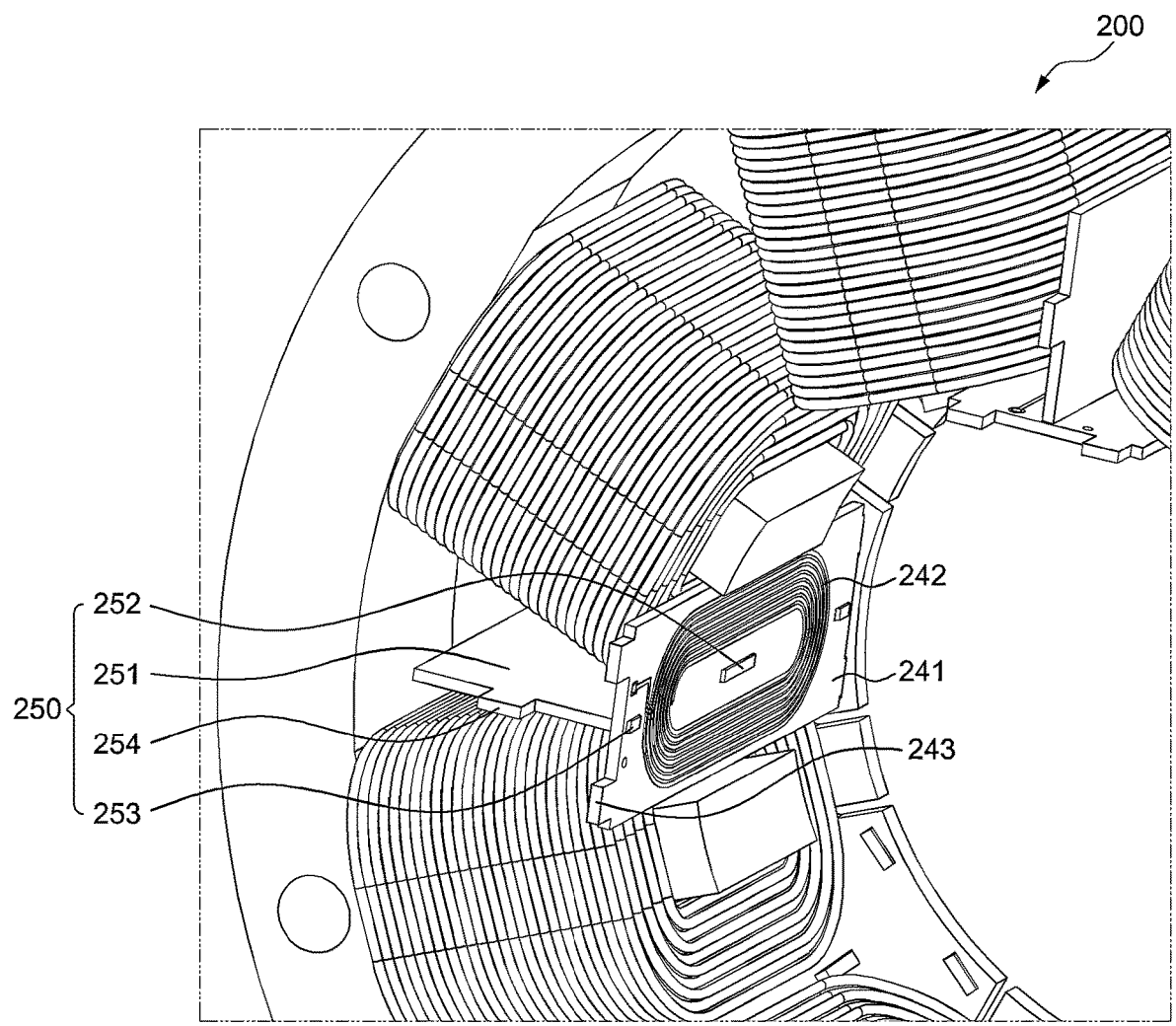
FIG. 10 is an enlarged perspective view of a sensor unit of the magnetic bearing having the colocated eddy-current displacement sensor according to the second embodiment of the present invention.
Figure 11:
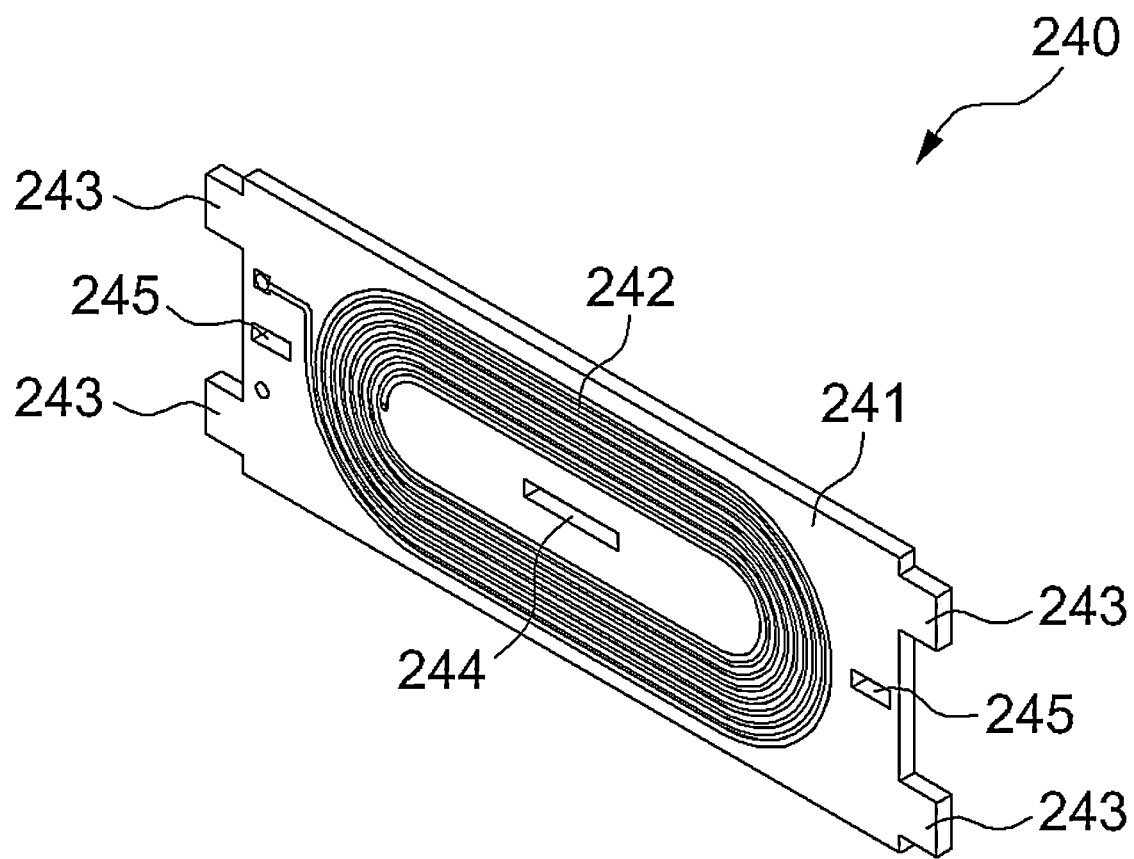
FIG. 11 is a perspective view of the sensor unit according to the second embodiment of the present invention.

FIG. 9 is a perspective view illustrating a state in which the amplifier unit of the magnetic bearing having the colocated eddy-current displacement sensor according to the second embodiment of the present invention is detached, FIG. 10 is an enlarged perspective view of a sensor unit of the magnetic bearing having the colocated eddy-current displacement sensor according to the second embodiment of the present invention, and FIG. 11 is a perspective view of the sensor unit according to the second embodiment of the present invention.

Referring to FIGS. 7 to 11, a magnetic bearing 200 having a colocated eddy-current displacement sensor according to a second embodiment includes an electromagnet unit 210, an amplifier unit 220, a coil wiring unit 230, sensor units 240, and support units 250.

The electromagnet unit 210 includes a casing 211, electromagnets 212, and column parts 213.

The casing 211 may be formed as a circular frame having a hollow portion formed therein.

The electromagnet 212 may be provided as a plurality of electromagnets 212 disposed along an inner periphery of the casing 211. The electromagnet and a permanent magnet may be disposed to generate a magnetic force according to a flow of an electric current.

A suspended body may be provided to be rotatable while being floated in the hollow portion in the casing 211 by the electromagnets 212.

The column parts 213 may be provided between the casing 211 and the coil wiring unit 230.

Specifically, the column parts 213 may be provided at preset intervals along a periphery of the other side surface of the casing 211.

The column parts 213, provided as described above, may fixedly couple the casing 211 and the coil wiring unit 230.

Although not illustrated, the column parts 213 may be further provided between the casing 211 and the amplifier unit 220.

The amplifier unit 220 may be coupled to one side of the electromagnet unit 210. The amplifier unit 220 may be manufactured as a PCB. The amplifier unit 220 may be provided in the form of a circular plate having a hollow portion therein and corresponding to a shape of the casing 211.

The coil wiring unit 230 may be coupled to the other side of the electromagnet unit 210. The coil wiring unit 230 may be manufactured as a PCB. The coil wiring unit 230 may be provided in the form of a circular plate having a hollow portion therein and corresponding to the shape of the casing 211.

The sensor unit 240 may be provided as a plurality of sensor units 240. The sensor unit 240 has two opposite ends respectively coupled to the coil wiring unit 230 and the amplifier unit 220 so that the sensor unit 240 is positioned inside the electromagnet unit 210.

Specifically, the sensor unit 240 may be positioned at a front side of a portion between the pair of electromagnets 212. The sensor units 240 may be disposed at preset intervals.

The sensor unit 240 may be provided colocatedly with the suspended body supported by the electromagnet unit 210 and measure a displacement of the suspended body. An eddy-current displacement sensor may be used as the sensor unit 240.

More specifically, the sensor unit 240 includes a sensor substrate 241, a sensor coil 242, protrusion bodies 243, a center hole 244, and edge holes 245.

The sensor substrate 241 may be configured as a PCB and extend toward the amplifier unit 220 and the coil wiring unit 230. In this case, the sensor substrate 241 may extend to be longer in length than the electromagnet 212.

In addition, the sensor substrate 241 may be positioned between the electromagnets 212 inside the electromagnet unit 210 so that the sensor substrate 241 is disposed in parallel with a tangential direction at any point on an outer periphery of a central axis. The sensor substrate 241, provided as described above, may measure well the displacement of the suspended body supported along the central axis by the electromagnet unit 210.

The sensor coil 242 may be provided on the sensor substrate 241 and configured as an eddy-current sensor coil.

The protrusion bodies 243 may protrude from four corners of the sensor substrate 241 in a longitudinal direction of the sensor substrate 241.

The protrusion bodies 243, provided as described above, may be provided to be fitted into holes formed in the coil wiring unit 230 and the amplifier unit 220.

The center hole 244 may be provided in the form of a hole at a center of the sensor substrate 241. In this case, the center hole 244 may extend to have a predetermined length in the longitudinal direction of the sensor substrate 241. The center hole 244 may be positioned at a center based on a width direction of the sensor substrate 241.

The edge holes 245 may be formed at two opposite ends based on the longitudinal direction of the sensor substrate 241. That is, the edge holes 245 may be positioned on the same line as the center hole 244.

The support unit 250 may be coupled between the sensor unit 240 and the casing 211 and extend to have a length corresponding to the sensor unit 240. Further, the support unit 250 may be disposed in a direction orthogonal to the sensor unit 240.

More specifically, the support unit 250 includes a support body 251, a center support protrusion body 252, edge support protrusion bodies 253, and a support coupling body 254.

The support body 251 may define a body of the support unit 250 and extend toward the amplifier unit 220 and the coil wiring unit 230 so as to have a length corresponding to the sensor substrate 241.

In addition, the support body 251 may be oriented in a direction orthogonal to the sensor substrate 241, one side surface of the support body 251 may be fixed to the casing 211, and the other side of the support body 251 may be fixed while supporting a rear central axis of the sensor substrate 241.

The center support protrusion body 252 may be formed on the other side surface of the support body 251 and provided at a position corresponding to the center hole 244. The center support protrusion body 252, provided as described above, may be fitted into the center hole 244.

The edge support protrusion bodies 253 may be formed on the other side surface of the support body 251 and provided at positions corresponding to the edge holes 245. The edge support protrusion bodies 253, provided as described above, may be fitted into the edge holes 245.

The support unit 250, provided as described above, may prevent the sensor unit 240 from being bent or deformed.

Specifically, because the sensor unit 240 is a PCB provided in the form of a thin plate, the sensor unit 240 may be bent or deformed when the casing 211 rotates at high speed, which makes it difficult to accurately measure the displacement of the suspended body.

However, according to the present invention, because the support unit 250 is provided to support a center vertical axis of the sensor unit 240, it is possible to prevent the deformation of the sensor unit 240.

In addition, the sensor unit 240 may also be positioned inside the electromagnet unit 210 by the above-mentioned coupling without deformation and accurately measure the displacement of the suspended body disposed colocatedly with the suspended body.

Figure 12:
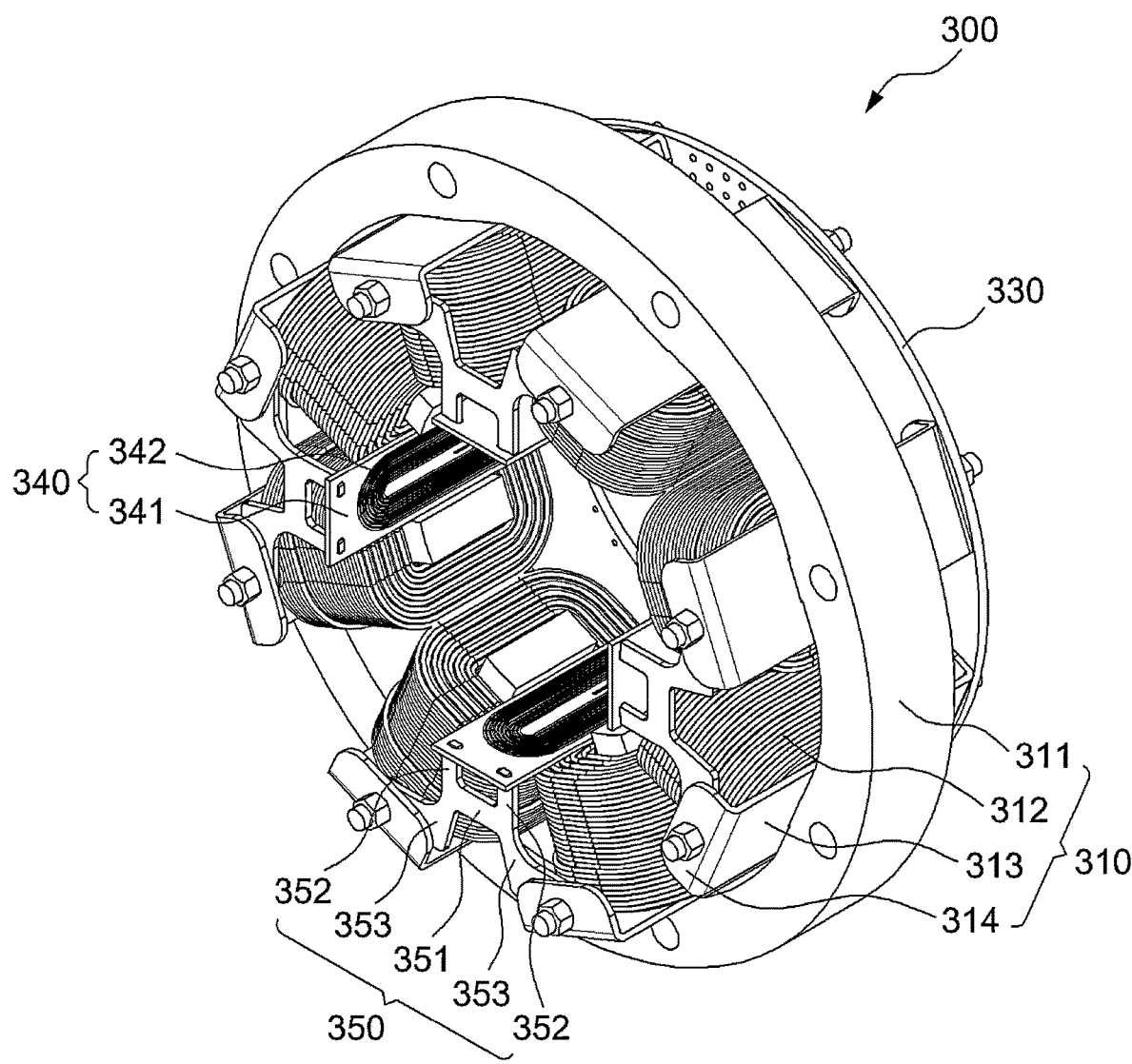
FIG. 12 is a perspective view illustrating a state in which an amplifier unit of a magnetic bearing having a colocated eddy-current displacement sensor according to a third embodiment of the present invention is detached.
Figure 13:
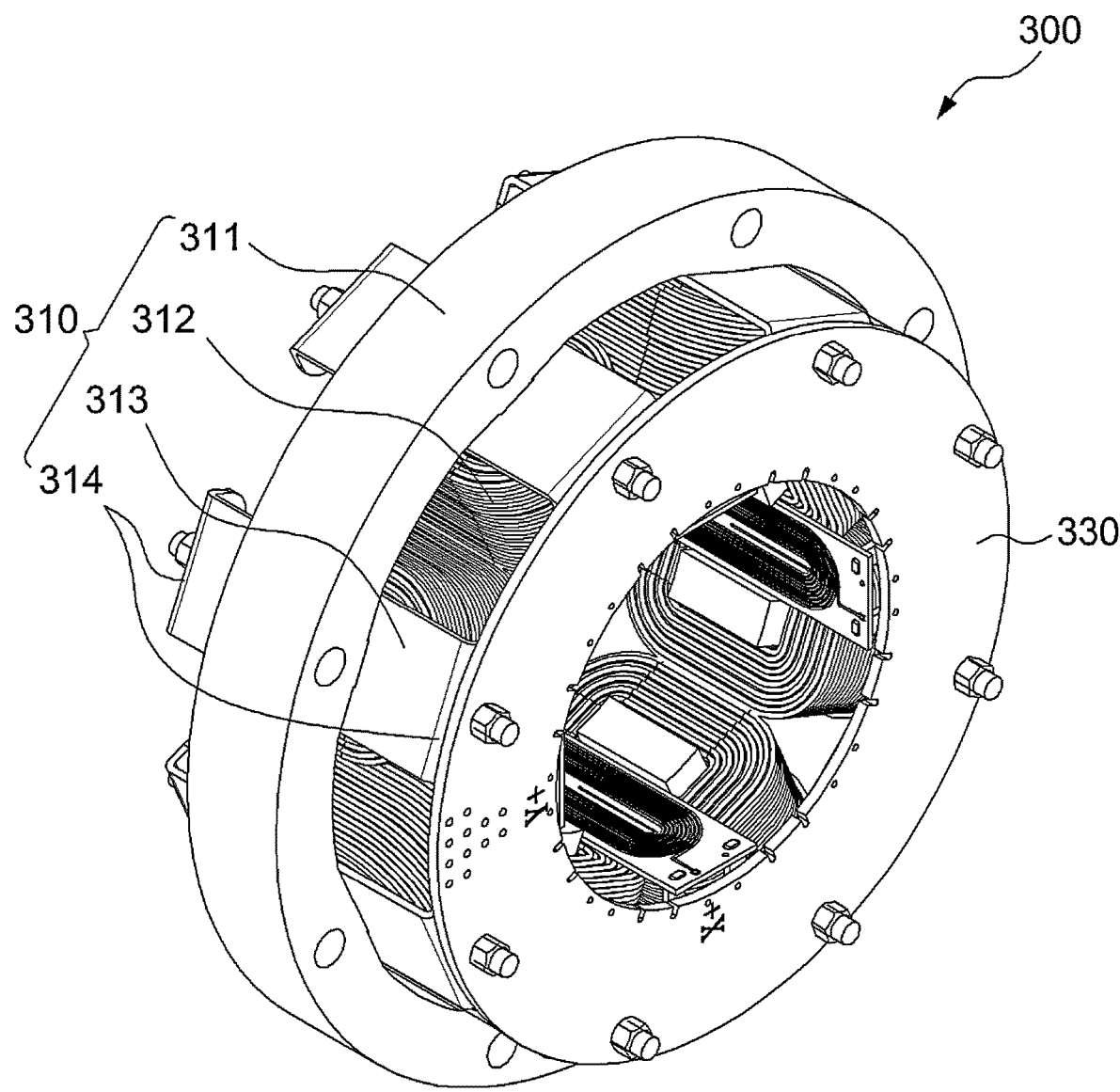
FIG. 13 is a perspective view illustrating a coil wiring unit of the magnetic bearing having the colocated eddy-current displacement sensor according to the third embodiment of the present invention.

FIG. 12 is a perspective view illustrating a state in which an amplifier unit of a magnetic bearing having a colocated eddy-current displacement sensor according to a third embodiment of the present invention is detached, and FIG. 13 is a perspective view illustrating a coil wiring unit of the magnetic bearing having the colocated eddy-current displacement sensor according to the third embodiment of the present invention.

Figure 14:
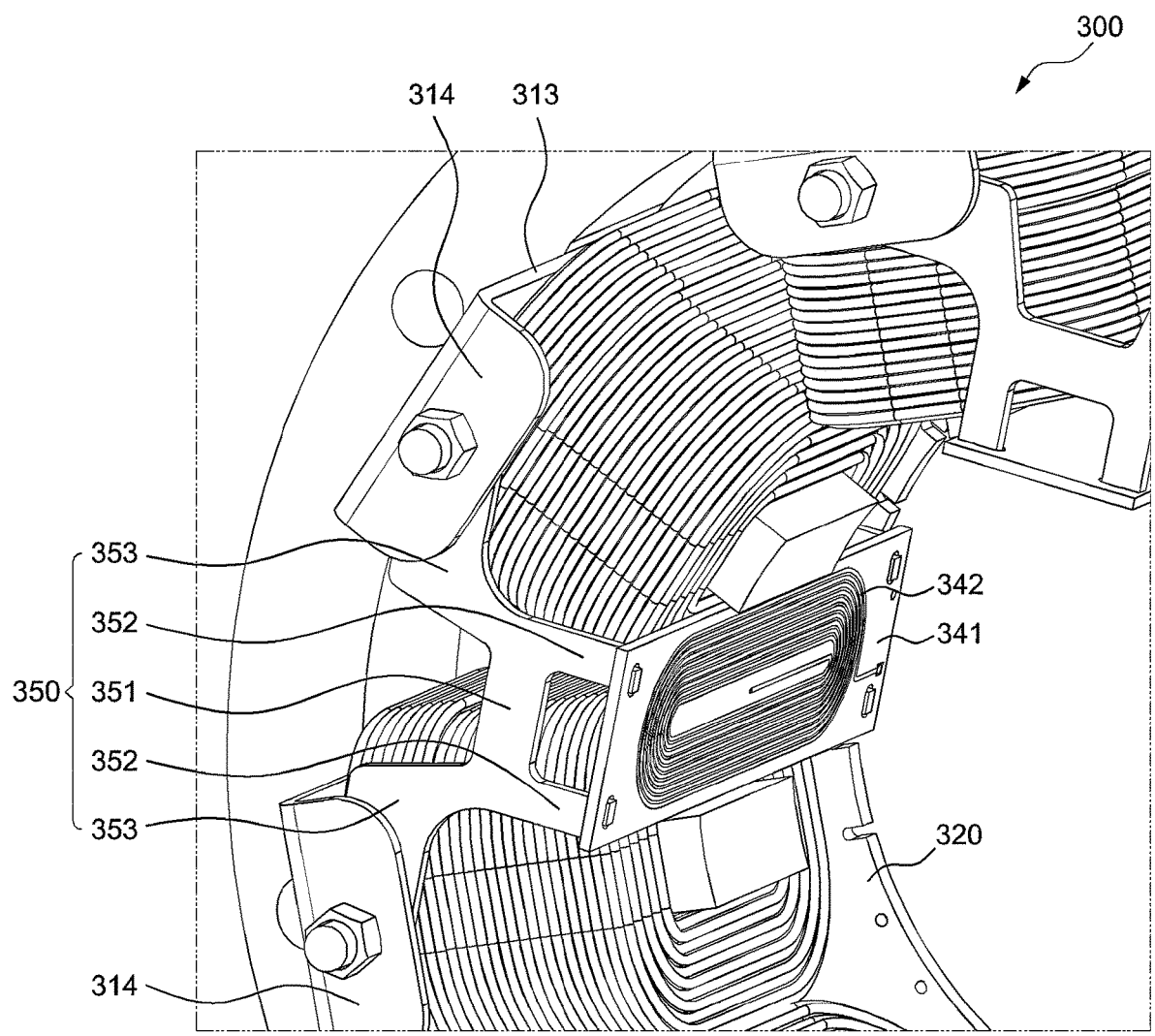
FIG. 14 is an enlarged perspective view illustrating a sensor unit magnetic bearing having the colocated eddy-current displacement sensor according to the third embodiment of the present invention.
Figure 15:
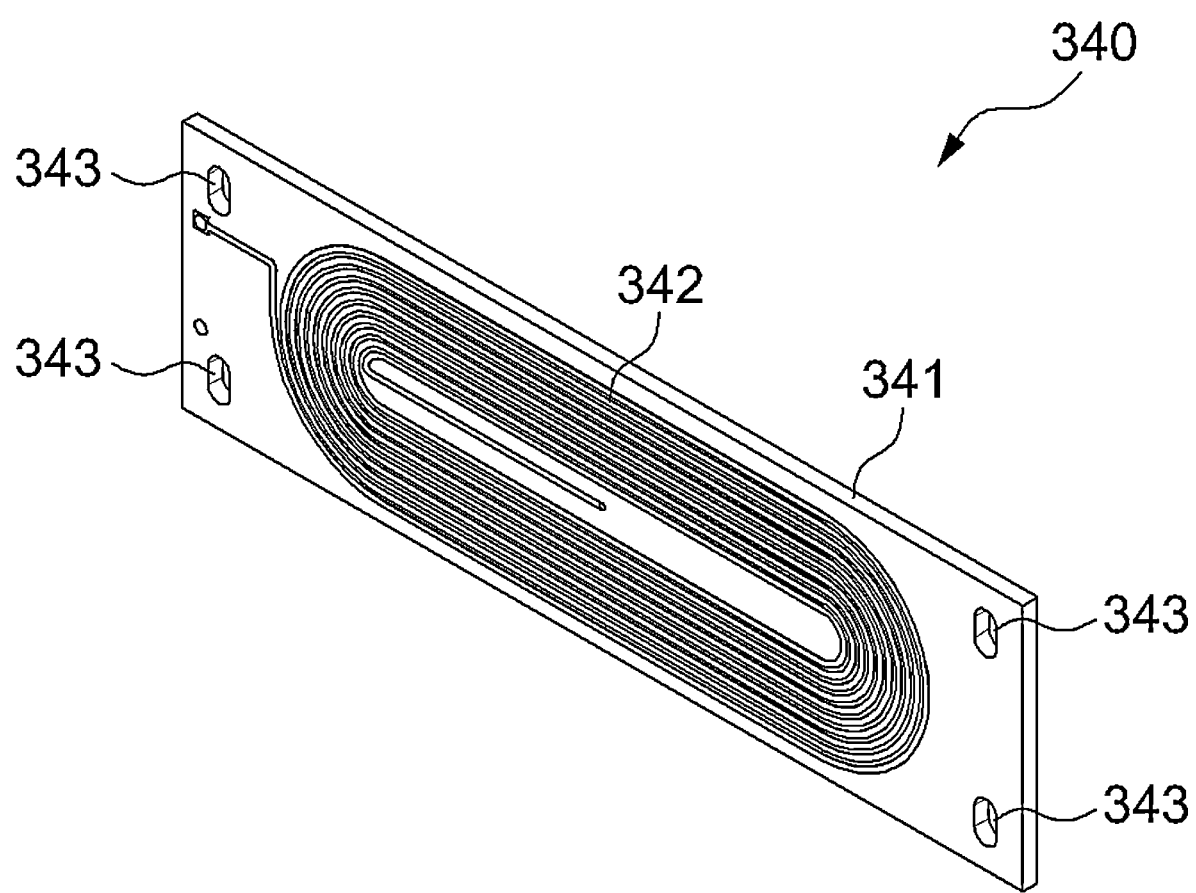
FIG. 15 is a perspective view of the sensor unit according to the third embodiment of the present invention.

FIG. 14 is an enlarged perspective view illustrating a sensor unit magnetic bearing having the colocated eddy-current displacement sensor according to the third embodiment of the present invention, and FIG. 15 is a perspective view of the sensor unit according to the third embodiment of the present invention.

Referring to FIGS. 12 to 15, a magnetic bearing 300 having a colocated eddy-current displacement sensor according to a third embodiment includes an electromagnet unit 310, an amplifier unit 320, a coil wiring unit 330, sensor units 340, and coupling units 350.

The electromagnet unit 310 includes a casing 311, electromagnets 312, vertical frames 313, and horizontal frames 314.

The casing 311 may be formed as a circular frame having a hollow portion formed therein.

The electromagnet 312 may be provided as a plurality of electromagnets 312 disposed along an inner periphery of the casing 311. The electromagnet and a permanent magnet may be disposed to generate a magnetic force according to a flow of an electric current.

A suspended body may be provided to be rotatable while being floated in the hollow portion in the casing 311 by the electromagnets 312.

The vertical frame 313 may be provided between the casing 311 and the electromagnet 312 and extend toward the coil wiring unit 330 and the amplifier unit 320.

Specifically, the vertical frames 313 may extend toward the casing 311 and the coil wiring unit 330 and toward the casing 311 and the amplifier unit 320.

Alternatively, the single vertical frame 313 may extend toward the coil wiring unit 330 and the amplifier unit 320.

The horizontal frame 314 may be provided at an end of the vertical frame 313 and coupled to the coil wiring unit 330 and the amplifier unit 320.

Specifically, the horizontal frame 314 may extend from the end of the vertical frame 313 and have a predetermined length in a direction parallel to the coil wiring unit 330 and the amplifier unit 320.

The vertical frames 313 and the horizontal frames 314 fixedly couple the casing 311 and the amplifier unit 320 and fixedly couple the casing 311 and the coil wiring unit 330.

The amplifier unit 320 may be coupled to one side of the electromagnet unit 310. The amplifier unit 320 may be manufactured as a PCB. The amplifier unit 320 may be provided in the form of a circular plate having a hollow portion therein and corresponding to a shape of the casing 311.

The coil wiring unit 330 may be coupled to the other side of the electromagnet unit 310. The coil wiring unit 330 may be manufactured as a PCB. The coil wiring unit 330 may be provided in the form of a circular plate having a hollow portion therein and corresponding to the shape of the casing 311.

The sensor unit 340 may be provided as a plurality of sensor units 340. The sensor unit 340 has two opposite ends respectively coupled to the coil wiring unit 330 and the amplifier unit 320 so that the sensor unit 340 is positioned inside the electromagnet unit 310.

Specifically, the sensor unit 340 may be positioned at a front side of a portion between the pair of electromagnets 312. The sensor units 340 may be disposed at preset intervals.

The sensor unit 340 may be provided colocatedly with the suspended body supported by the electromagnet unit 310 and measure a displacement of the suspended body. An eddy-current displacement sensor may be used as the sensor unit 340.

More specifically, the sensor unit 340 includes a sensor substrate 341, a sensor coil 342, and fitting holes 343.

The sensor substrate 341 may be configured as a PCB and extend toward the amplifier unit 320 and the coil wiring unit 330. In this case, the sensor substrate 341 may extend to be longer in length than the electromagnet 312.

In addition, the sensor substrate 341 may be positioned between the electromagnets 312 inside the electromagnet unit 310 so that the sensor substrate 341 is disposed in parallel with a tangential direction at any point on an outer periphery of a central axis. The sensor substrate 341, provided as described above, may measure well the displacement of the suspended body supported along the central axis by the electromagnet unit 310.

The sensor coil 342 may be provided on the sensor substrate 341 and configured as an eddy-current sensor coil.

The fitting holes 343 may be formed at four corners of the sensor substrate 341. The fitting hole 343 may be provided in the form of a hole. In this case, the fitting hole 343 may extend to be longer in the width direction of the sensor substrate 341 than in the longitudinal direction of the sensor substrate 341.

The coupling unit 350 may be configured to further couple and fix the sensor unit to the horizontal frame 314 and include a coupling body 351, fitting bodies 352, and fixing bodies 353.

The coupling body 351 may define a body of the coupling unit 350 and extend in a direction parallel to the sensor substrate 341.

The fitting bodies 352 may extend toward the fitting holes 343 disposed adjacent to the two opposite ends of the coupling body 351. The fitting body 352, provided as described above, may be fitted into the fitting holes 343.

The fixing bodies 353 may extend to be coupled to the horizontal frames 314 disposed adjacent to the two opposite ends of the coupling body 351.

The fixing bodies 353 are fitted into the fitting holes 343 formed at the four corners of the sensor unit 340, such that the sensor unit 340 may be stably supported and fixed.

More specifically, the fixing bodies 353 may be coupled to lower sides of the horizontal frames 314, and the coil wiring unit 330 or the amplifier unit 320 may be coupled to upper sides of the horizontal frames 314.

The coupling units 350, provided as described above, may prevent the sensor unit 340 from being bent or deformed.

Specifically, because the sensor unit 340 is a PCB provided in the form of a thin plate, the sensor unit 340 may be bent or deformed when the casing 311 rotates at high speed, which makes it difficult to accurately measure the displacement of the suspended body.

However, according to the present invention, because the coupling unit 350 is provided to support the four corners of the sensor unit 340, it is possible to prevent the deformation of the sensor unit 340.

According to the present invention configured as described above, the sensor unit 340 is disposed inside the electromagnet unit 110, which makes it possible to reduce a sensor installation space and manufacturing costs and solve a problem of sensor noise.

In addition, according to the present invention, the sensor unit 340 is assembled by fitting, which makes it easy to assemble and disassemble the sensor unit 340.

In addition, according to the present invention, the sensor unit 340 is positioned on the same central axis as the suspended body, which makes it possible to improve accuracy in measuring the displacement.

It will be appreciated that the embodiments of the present invention have been described above for purposes of illustration, and those skilled in the art may understand that the present invention may be easily modified in other specific forms without changing the technical spirit or the essential features of the present invention. Therefore, it should be understood that the above-described embodiments are illustrative in all aspects and do not limit the present invention. For example, each component described as a single type may be carried out in a distributed manner. Likewise, components described as a distributed type can be carried out in a combined type.

The scope of the present invention is represented by the claims to be described below, and it should be interpreted that the meaning and scope of the claims and all the changes or modified forms derived from the equivalent concepts thereto fall within the scope of the present invention.

DESCRIPTION OF REFERENCE NUMERALS

1: Magnetic bearing in related art
2: Bearing
3: Sensor
100: Magnetic bearing having colocated eddy-current displacement sensor according to first embodiment
110: Electromagnet unit
111: Casing
112: Electromagnet
113: Vertical frame
114: Horizontal frame
120: Amplifier unit
130: Coil wiring unit
140: Sensor unit
141: Sensor substrate
142: Sensor coil
143: Protrusion body
144: Center hole
145: Edge hole
150: Support unit
151: Support body
152: Center support protrusion body
153: Edge support protrusion body
154: Support coupling body
160: Reinforcement unit
161: Vertical reinforcement body
162: Reinforcement coupling body
200: Magnetic bearing having colocated eddy-current displacement sensor according to second embodiment
210: Electromagnet unit
211: Casing
212: Electromagnet
213: Column part
220: Amplifier unit
230: Coil wiring unit
240: Sensor unit
241: Sensor substrate
242: Sensor coil 243: Protrusion body
244: Center hole
245: Edge hole
250: Support unit
251: Support body
252: Center support protrusion body
253: Edge support protrusion body
254: Support coupling body
300: Magnetic bearing having colocated eddy-current displacement sensor according to third embodiment
310: Electromagnet unit
311: Casing
312: Electromagnet
313: Vertical frame
314: Horizontal frame
320: Amplifier unit
330: Coil wiring unit
340: Sensor unit
341: Sensor substrate
342: Sensor coil
343: Fitting hole
350: Coupling unit
351: Coupling body
352: Fitting body
353: Fixing body

The invention claimed is:

1. A magnetic bearing having a colocated eddy-current displacement sensor, the magnetic bearing comprising:
an electromagnet unit including a circular casing having a hollow portion therein, the electromagnet unit having a plurality of electromagnets disposed along an inner periphery of the circular casing;
an amplifier unit coupled to one side of the electromagnet unit;
a coil wiring unit coupled to another side of the electromagnet unit; and
a plurality of sensor units disposed along an inner periphery of the electromagnet unit and each having two opposite ends respectively coupled to the coil wiring unit and the amplifier unit, the plurality of sensor units being disposed between the coil wiring unit and the amplifier unit,
wherein each of the plurality of sensor units is disposed to be co-located with a suspended body supported by the electromagnet unit, the plurality of sensor units being configured to measure a displacement of the suspended body,
wherein each of the plurality of sensor units comprises:
a sensor substrate having a PCB;
a sensor coil disposed on the sensor substrate; and
protrusion bodies protruding from four corners of the sensor substrate in a longitudinal direction of the sensor substrate,
wherein the protrusion bodies are configured to be fitted into holes defined in the coil wiring unit and the amplifier unit.

2. The magnetic bearing of claim 1,
wherein the electromagnet unit comprises:
a vertical frame disposed between the circular casing and each of the plurality of electromagnets and extending toward the coil wiring unit and the amplifier unit; and
a horizontal frame disposed at an end of the vertical frame and coupled to the coil wiring unit or the amplifier unit.

3. The magnetic bearing of claim 1, further comprising:
a support unit coupled between each of the plurality of sensor units and the circular casing and extending to have a length corresponding to each of the plurality of sensor units,
wherein the support unit is disposed in a direction orthogonal to each of the plurality of sensor units.

4. The magnetic bearing of claim 3,
wherein each of the plurality of sensor units comprises:
a center hole defined at a center of the sensor substrate; and
edge holes defined at two opposite ends of the sensor substrate, respectively, based on a longitudinal direction of the sensor substrate, and
wherein the support unit is configured to be fitted into the center hole and the edge holes.

5. The magnetic bearing of claim 1, further comprising:
a reinforcement unit having two opposite ends coupled to the coil wiring unit and the amplifier unit, respectively.

6. The magnetic bearing of claim 1,
wherein the electromagnet unit further comprises a column part disposed between the circular casing and the coil wiring unit, and
wherein the column part is a plurality of column parts disposed along a periphery of one side surface of the circular casing.

7. The magnetic bearing of claim 2, further comprising:
a coupling unit configured to further couple and fix each of the plurality of sensor units to the horizontal frame.

8. The magnetic bearing of claim 7,
wherein each of the plurality of sensor units further comprises:
a sensor coil disposed on the sensor substrate; and
fitting holes defined at four corners of the sensor substrate.

9. The magnetic bearing of claim 8,
wherein the coupling unit comprises:
a coupling body having a body and extending in a direction parallel to the sensor substrate;
a pair of fitting bodies extending toward the fitting holes defined adjacent to two opposite ends of the coupling body, the pair of fitting bodies being fitted into the fitting holes; and
a pair of fixing bodies extending from the two opposite ends of the coupling body, each of the pair of fixing bodies extending to be coupled to the horizontal frame that is adjacent to each of the pair of fixing bodies.

10. A magnetic bearing having a colocated eddy-current displacement sensor, the magnetic bearing comprising:
an electromagnet unit including a circular casing having a hollow portion therein, the electromagnet unit having a plurality of electromagnets disposed along an inner periphery of the circular casing;
an amplifier unit coupled to one side of the electromagnet unit;
a coil wiring unit coupled to another side of the electromagnet unit; and
a plurality of sensor units disposed along an inner periphery of the electromagnet unit and each having two opposite ends respectively coupled to the coil wiring unit and the amplifier unit, the plurality of sensor units being disposed between the coil wiring unit and the amplifier unit,
wherein each of the plurality of sensor units is disposed to be co-located with a suspended body supported by the electromagnet unit, the plurality of sensor units being configured to measure a displacement of the suspended body, wherein each of the plurality of sensor units comprises:
a center hole defined at a center of a sensor substrate having a PCB; and
edge holes defined at two opposite ends of the sensor substrate, respectively, based on a longitudinal direction of the sensor substrate, and
wherein a support unit is configured to be fitted into the center hole and the edge holes.

11. A magnetic bearing having a colocated eddy-current displacement sensor, the magnetic bearing comprising:
an electromagnet unit including a circular casing having a hollow portion therein, the electromagnet unit having a plurality of electromagnets disposed along an inner periphery of the circular casing;
an amplifier unit coupled to one side of the electromagnet unit;
a coil wiring unit coupled to another side of the electromagnet unit; and
a plurality of sensor units disposed along an inner periphery of the electromagnet unit and each having two opposite ends respectively coupled to the coil wiring unit and the amplifier unit, the plurality of sensor units being disposed between the coil wiring unit and the amplifier unit,
wherein each of the plurality of sensor units is disposed to be co-located with a suspended body supported by the electromagnet unit, the plurality of sensor units being configured to measure a displacement of the suspended body,
wherein each of the plurality of sensor units further comprises:
a sensor substrate having a PCB;
a sensor coil disposed on the sensor substrate; and
fitting holes defined at four corners of the sensor substrate.

* * * * *